CONCENTRATION VS pH FOR SOLUTIONS OF DIETHYLENETRIAMINE IN DEIONIZED WATER

United States Patent Office 3,531,332
Patented Sept. 29, 1970

3,531,332
PROCESS FOR TREATING ALUMINUM
BASE ARTICLES
John A. Scott, North Haven, and William H. Anthony,
Guilford, Conn., assignors to Olin Corporation, a corporation of Virginia
Continuation-in-part of application Ser. No. 448,288,
Apr. 15, 1965. This application Sept. 24, 1968, Ser.
No. 761,933
Int. Cl. C23f 7/06
U.S. Cl. 148—6.27                                14 Claims

ABSTRACT OF THE DISCLOSURE

The process which comprises contacting aluminum for from 5 seconds to less than 15 seconds with a solution consisting essentially of purified water and from 0.001 to 0.3% by weight of a substance selected from the group consisting of triethanolamine, diethylenetriamine and hydrazine which maintain an aqueous solution pH in the range 7 to 11, said solution being at a temperature of 85° C. to boiling and a pH of 7 to 11, and then applying an organic coating to the so-treated aluminum, the treatment resulting in said coating having improved adherence to said aluminum.

---

Figure 1:
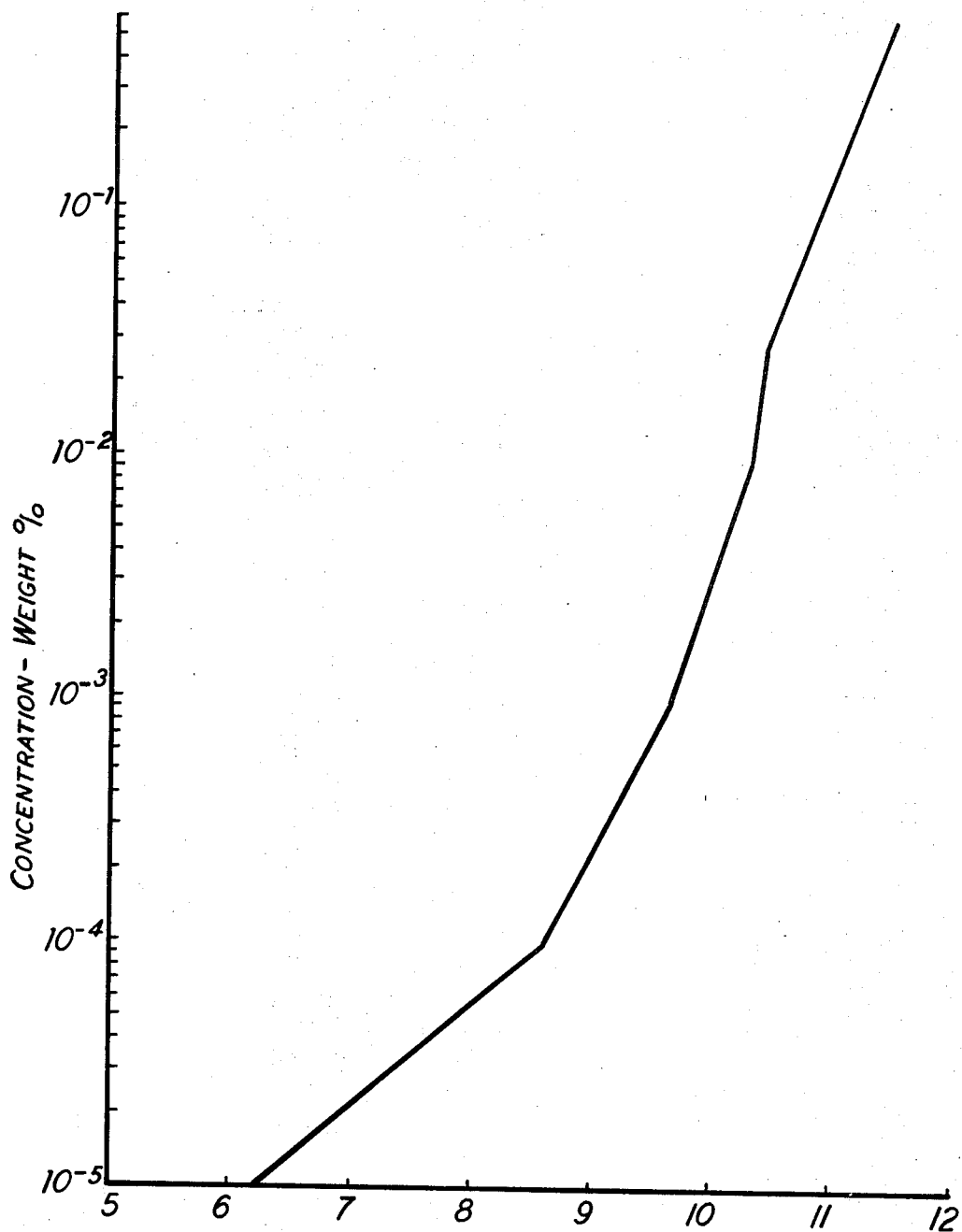

This application is a continuation-in-part of co-pending application Ser. No. 448,288, now abandoned, filed Apr. 15, 1965.

The present invention relates to a process for the treatment of aluminum and to an improved article obtained thereby. More particularly, the present invention resides in an improved process for treating aluminous metals which serves to improve the treated metal, for example, upon subsequent processing, such as painting or adhesive coating.

It is frequently desirable or necessary to paint or otherwise coat aluminum. For example, in architectural or ornamental applications, aluminum is frequently painted to improve its appearance for a particular application. Similarly, for many applications it is desirable to coat or clad aluminum with a dissimilar material, for example, a plastic film.

It is generally necessary to pretreat the aluminum in some manner before coating in order to obtain adequate adhesion between the aluminum and the coating and to obtain adequate durability of the coating. For example, in the continuous application of paint to aluminum strip, it is accepted practice to apply a corrosion protecting conversion coating in the line prior to the paint application. The conversion coating is applied by contacting the metal strip with an aqueous, complex, chemical solution. For example, a typical chromate conversion coating solution which is used contains chromate, fluoride and cyanide ions.

These solutions are subject to the disadvantage that they require close pH control and careful regulation of the critical components of the complex solution.

In addition, conversion coatings are invariably applied in the preliminary stages of the paint strip line. If there is a delay before the paint is applied to the conversion coated surface, unacceptable adhesion and poor weathering endurance are apt to result. Still further, conversion coating equipment frequently requires a high proportion of the total capital outlay in the machinery and floor space required for the conversion coating stages. Further, the continuing cost of the chemical conversion coating treatment is quite expensive due to the high chemical cost, the difficult control problems and the high maintenance cost. An additional and troublesome problem with conversion coating or similar treatments is that frequently these treatments utilize high concentrations of chemical materials and high toxicity materials.

In addition to the foregoing significant and troublesome disadvantages attendant upon conventional pretreatment of aluminum, the conventional treatments frequently attain results which are either not acceptable or leave much to be desired.

Accordingly, it is a principal object of the present invention to provide an improved method for treating aluminum or aluminum base alloys which renders the metal susceptible to further coating processes.

It is an additional object to provide an improved article resulting from said treatment and further an improved coated article.

It is a further object of the present invention to provide a process as aforesaid which enables a coated metal article having improved adhesion and durability of the coating.

It is a further object of the present invention to provide a process for treating metals as aforesaid which is inexpensive and readily usable on a commercial scale, especially short treatment times.

It is a still further object of the present invention to provide a process for treating metals which utilizes a treating solution of low toxicity and low concentration, and which requires only simple pH control.

It is an additional object of the present invention to provide an improved process for treating metals to render the metal more susceptible to further coating treatment, which improved process may be performed if desired with significant time delays prior to the coating process.

In general, it is a particular object of the present invention to provide an improved process as aforesaid which overcomes the substantial and significant disadvantage of conventional treatment procedures.

Further objects and advantages of the present invention will appear hereinafter.

In accordance with the present invention, it has now been found that the foregoing objects and advantages of the present invention may be readily accomplished. The process of the present invention comprises contacting aluminum, including base alloys thereof, for from 5 seconds to less than 15 seconds, and preferably 7 to less than 15 seconds, with a solution containing purified water, preferably having a specified resistance of from 0.5 to 4 megohm-centimeters, for example, deionized water or distilled water, and from 0.001 to 0.3% by weight of an amine or hydrazine derivative which maintains an aqueous solution pH in the range of 7 to 11, said solution being at a temperature of from 85° C. to boiling and a pH of 7 to 11.

It has been found that the foregoing simple and convenient process surprisingly achieves all of the foregoing objects of the present invention and attains a greatly improved treatment process and an improved treated metal.

It is a particular and surprising advantage of the present invention that the foregoing process attains such improved results with very short contact times, with in fact the preferred contact times being from 7 to 10 seconds. It is particularly surprising that such improved results can be attained with contact times of such a short duration.

In general, the improved characteristics of the instant treatment process include a process characterized by lower concentration, lower chemical cost and easier maintenance and control characteristics than conventional processes. In addition, the present process requires only simple pH control as compared to conventional frequent pH monitoring plus frequent titration. In addition, the chemical treatment process of the present invention utilizes lower toxicity materials and an easily handled single component solution, as compared to chromate conversion coating solutions which use highly toxic chromates, fluorides and cyanides at relatively high concentrations. Still further, the delay between the treatment of the present invention and subsequent coating does not present a problem in the present process.

In addition, the present invention attains a greatly improved process for treating metals, as indicated above, that retains the natural appearance of the metal without sacrificing effectiveness of the treatment. This makes possible the use of clean, unpigmented coatings on the metal with better adhesion and durability than was possible heretofore. In addition, the elimination of toxicity makes it easier for the processor who is having difficulty handling and disposing of chromate conversion coating solutions. Also, chromate conversion coatings are unsuitable for aluminum cans used for food packaging which require a pretreatment before being lacquered and the present process overcomes this difficulty.

Perhaps of even greater significance is the fact that aluminum treated in accordance with the present process is characterized by improved durability of coatings, such as paint, than has been conventionally attained.

The present invention may be used with any aluminum base alloy, for example, high purity aluminum or aluminum base alloys may be readily used. Exemplificative alloys which may be utilized include but are not limited to aluminum alloys 1100, 2014, 2024, 3003, 3004, 4043, 5005, 5052, 5083, 5086, 6061, 6063 and 7075.

The treatment solution of the present invention is contacted with the aluminum for a period of from 5 seconds to less than 15 seconds, and preferably from 7 to less than 15 seconds. In fact, it has further been found that the best results are obtained in the shorter times of 7 to 10 seconds. The fact that improved results may be obtained with such short treatment times renders the present process particularly suitable to a commercial operation utilizing a roll coating process in, for example, a paint strip line. The roll coating process requires that pretreatment times of the order of less than 15 seconds be used since at line speeds of 200 to 300 feet per minute practical limits of the length of treatment baths are soon reached. In conventional conversion coating processes, the requirement for short contact times requires the addition of special chemicals, such as fluorides to conversion coating treatments so that the treatment provides sufficient bite to the aluminum surface in the short treatment time available. It is a particular advantage of the present invention that painted aluminum panels pretreated in accordance with the present process at treatment times of less than 15 seconds have shown superior durability performance in accelerated tests despite the absence of special chemicals, such as fluorides.

The treatment solution of the present invention utilizes purified water, i.e., water which has its impurities removed. In general, the water should have a specific resistance of at least 0.5 megohm-centimeter, and preferably from 1½ to 2½ megohm-centimeters. Typical methods for obtaining this purified water include preferably utilizing deionized water or distilled water.

The present invention is directed to establishing optimum operating parameters of the amine/hydrazine pretreatment for aluminum.

Six different amines and hydrazines (listed in Table III) at a series of concentrations and treatment times were tested. Three of these products, diethylenetriamine, triethanolamine and hydrazine were substantially more effective for improving paint permanence than the prior art commercial chromate conversion coating.

Effective concentrations of the amines are low (0.01% to 0.1%) and the solution is effective for at least 20 square feet of treated aluminum per gallon. Thus, the cost of the chemicals is low in comparison with the conversion coating chemicals.

The amines used in the treatment are low in toxicity and, therefore, easy to dispose of compared to the toxic chromates and fluorides in conversion coating solutions. Surface coatings left by the treatment are non-toxic which gives it excellent potential as a prelacquer treatment for food containers.

The surface produced by the treatment is colorless and thus can be used in applications where the natural aluminum color is desired. Tests with clear lacquers over the treated surfaces show that the treatment is more effective than the normally colored conversion coating and much more effective than the special thin, uncolored conversion coating used for aluminum can lacquering.

Storage tests demonstrate that surfaces treated by the process of the present invention are still highly satisfactory surfaces for painting even after five months storage in a machine shop atomsphere. This factor is of importance in applications such as sign blanks and certain aluminum can uses where it is desired to paint the article after some time has elapsed since pretreatment. Chromate conversion coatings lose effectiveness unless organic coatings are applied immediately after pretreatment.

Tests of an adhesive bonding after the pretreatment show that it is more effective in improving bond permanence than the standard sulfuric acid dichromate etch widely used as a metal pretreatment before bonding.

TOXICITY CONSIDERATIONS

Toxicity of pretreatments is of importance for two reasons. First, toxicity currently poses a problem for the processor in a roll coating line. Handling highly toxic materials such as chromates is a potential hazard to personnel and disposal of waste solutions containing chromates is becoming more difficult because of more stringent waste disposal laws.

Secondly, for food applications in the can industry, chromate concentrations of conversion coatings must be reduced to such a low level that the effectiveness of the treatment is much less than at optimum concentrations.

The toxicities of triethanolamine and diethylenetriamine are of a lower order than those of chromates and fluorides which are used in chromate conversion coatings. Hydrazine, while having a toxic rating of 3, when diluted to the concentration to be used in the present invention, a much lower toxicity is obtained than with either sodium dichromate or sodium fluoride.

The toxicity ratings for some amines and the main constituents in chromate conversion coatings are given in the following table.

TABLE I

| Material | Toxicity [1] | | |
|---|---|---|---|
| | Irritant | Ingestion | Inhalation |
| Diethylenetriamine | 2 | 2 | 2 |
| Triethanolamine | 1 | 1 | 1 |
| Hydrazine | 3 | 3 | 3 |
| Sodium dichromate | 3 | 3 | 3 |
| Sodium fluoride | 3 | 3 | 3 |

[1] N.I. Sax, "Dangerous Properties of Industrial Materials," Rheinhold Publishing Company, New York, New York, 1963.
NOTE.—Toxicity Rating Code: 0=None; 1=Slight; 2=Moderate; 3=High.

MINIMUM TREATMENT TIME

The demands of the coil coating industry (continuous application of paint to metal strip) require short paint pretreatment times to keep the size of equipment within practical limits. Chromate conversion coatings are being successfully applied in treatment times of approximately 15 seconds. Thus, we considered the commercial feasibility of the tests to depend upon attainment of treatment times of less than 15 seconds, more desirably, 5 to 10 seconds.

The treatment time to produce highly effective surfaces has been found to be 5 to less than 15 seconds, preferably 7 to less than 15 seconds, more preferably 7 to 10 seconds.

GENERAL PROCESSING PROCEDURES

(1) Prepaint treatment

The aluminum sheet specimens to be treated were first cleaned in an alkaline etching cleaner. After cleaning and rinsing the specimens were immersed in a boiling deionized water solution of the amine or hydrazine under test using predetermined concentrations and times. The specimens were then rinsed with deionized water or a water solution of chromic acid and finally air dried before being painted or bonded.

(2) Conversion coating

The specimens to be conversion coated were first treated in a five percent solution of a silicate free non-etching cleaning solution at 130–135° F. for five minutes, rinsed with water and air dried. They were then immersed in a solution containing 7.5 gms. of chromate conversion solution containing $H_2SO_4$, fluoride ions and chromic acid as active ingredients per 1000 ml. of water for 15 seconds at a temperature of about 90° F. Next they were rinsed in water and air dried.

(3) Accelerated exposure conditions (CASS exposure)

The accelerated exposure procedure selected for evaluating paint adhesion was the so-called CASS test. This is a modification of the ASTM Designation B287-62 method which describes a procedure for exposing painted ferrous or non-ferrous metals to 5% sodium chloride acidified to pH 3.1 to 3.3 with acetic acid in the form of a fog or spray at 120° F. The CASS solution consists of the acidified salt solution of the ASTM method with the addition of 0.025% cupric chloride dihydrate.

The CASS modification, hereinafter referred to as the CASS exposure, causes much greater corrosive undercutting of paint at the scribe lines than the ASTM acetic acid salt spray because of a galvanic corrosion process resulting from deposited copper on bare metal at the scribed areas.

The CASS exposure is used to evaluate the suitability of coatings for prepainted aluminum house siding. This testing method was adapted because our tests showed that different pretreatments could be distinguished by performance in this test after short exposures. An exposure time of 96 hours was used.

(4) Evaluation of CASS exposed specimens

Exposure of the painted specimen to the CASS test causes lifting of the paint from the metal surface adjacent to the scribe lines to varying degrees depending upon the effectiveness of the pretreatment and time of exposure for a given paint system. The lifting of paint generally occurs in a way which exposes circular spots of bare metal. The diameter of these spots was used as a means of evaluating the effectiveness of the pretreatment under test. For a given time of exposure to CASS the smaller the areas of metal exposed the more effective the pretreatment.

The equivalent diameter of exposed metal spots corresponding to the 1 to 5 rating was as follows.

Table II

| Rating after CASS test: | Equivalent diameter of spot, inches |
|---|---|
| 1 | 0 to 1/32 |
| 2 | 1/32 to 1/16 |
| 3 | 1/16 to 1/8 |
| 4 | 1/8 to 1/4 |
| 5 | over 1/4 |

EXAMPLE I

The following test was made to determine the effectiveness of different amines in the process of the present invention in comparison to chromate conversion coating. Samples of aluminum alloy were cleaned followed by 15 seconds immersion in 100° C. solutions of amines as follows.

Duplicate panels of the same aluminum alloy were treated with a conversion coating treatment.

All panels were dip coated at 1″ per minute with an alkyd paint, and dried and baked.

After aging for 4 days, the panels were diagonally scribed through to metal on one surface and CASS tested for 96 hours.

Evaluation of the panels after the CASS exposure showed that all panels treated in accordance with the present invention provided better protection than the conversion coating panels. The results are shown in the following table wherein replication was two specimens per treatment:

TABLE III

| Treatment No.: | Amine | Concentration wt. percent | Water for solution | Numerical rating of 5 specimens |
|---|---|---|---|---|
| 1 | Diethylenetriamine | 0.1 | Deionized distilled water | 4, 4 |
| 2 | Ethylenediamine | 0.1 | do | 4, 4 |
| 3 | Monoethanolamine | 0.1 | do | 3, 2 |
| 4 | Methyl diethanolamine | 0.1 | do | 4, 4 |
| 5 | Hydrazine | 0.1 | do | 1, 1 |
| 6 | Diethylamine | 0.1 | do | 4, 4 |
| 7 | Triethanolamine | 0.1 | do | 1, 1 |
| 8 | Diethylenetriamine | 0.1 | Deionized tap water | 3, 3 |
| 9 | do | 0.025 | do | 1, 1 |
| Conversion coated | | | | 5, 5 |

EXAMPLE II

DET (diethylenetriamine) at 0.025% concentration was used for the treatment on alloy 3003 panels and treatment times from 5 to 10 seconds in one second increments were used. The treated 3003 alloy panels were then coated with alkyd paint and exposed to CASS for 96 hours.

The following table gives the numerical ratings after CASS exposure.

TABLE IV

| Treatment | Time of treatment, seconds | Rating after CASS test |
|---|---|---|
| DET 0.025 wt. percent | 5 | 4, 5, 5, 5, 5 |
| Do | 6 | 4, 3, 2, 2, 5 |
| Do | 7 | 1, 1, 1, 1, 1 |
| Do | 8 | 1, 1, 1, 1, 1 |
| Do | 9 | 1, 1, 1, 1, 1 |
| Do | 10 | 1, 1, 1, 1, 1 |
| Conversion coating | 15 | 2, 2, 2, 2, 2 |

Results show that treatment times as short as 7 seconds confer better resistance of paint subsequently applied to CASS exposure than the conversion coating applied at the optimum treatment time of 15 seconds recommended.

EXAMPLE III

Effective concentration

The cost of chemicals in the process is directly related to solution concentration. Therefore, we looked for minimum concentration consistent with optimum performance.

Alloy 3003 panels were cleaned and immersed for periods of 5, 7 and 9 seconds in boiling solutions of DET at concentrations of .1, .01, .001, .0001, .00001 and 0 percent. They were then coated with alkyd paint and exposed to CASS for 96 hours. A replication of 3 panels was used for each set of conditions.

Results are given in the following table.

TABLE V

| | Rating After CASS Test for Various DET Concentrations in Weight Percent | | | | | |
|---|---|---|---|---|---|---|
| | .1 | .01 | .001 | .0001 | 0000.1 | 0 |
| Immersion time, secs.: | | | | | | |
| 5 | 5,5,5 | 5,5,5 | 5,5,5 | 5,5,5 | 5,5,5 | 5,5,5 |
| 7 | 4,5,4 | 3,1,1 | 5,5,5 | 5,5,5 | 5,5,5 | 5,5,5 |
| 9 | 3,1,1 | 1,1,1 | 4,1,1 | 2,4,1 | 5,5,5 | 5,5,5 |

Test results are slightly erratic in this particular CASS test. Those skilled in the art are aware of the variability frequently encountered in accelerated corrosion tests of this kind. However, we observe that acceptable durability of the coating is produced by 7 seconds immersion at a concentration of .01 percent and at 9 seconds immersion the range of useful concentration is probably in the range .1 to .001 percent. These observations are in good agreement with data in the previous test series (Table V).

The effect of DET concentration on pH of the solution is shown in FIG. 1.

EXAMPLE IV

Tests on alloy 5005

Most of the production on aluminum roll coating lines is in 3003 or other alloys of the 3003 series, but some magnesium alloys are also coated. Tests were made to verify the effectiveness of the process on 5005.

Panels of alloy 5005 were pretreated using 0.025% of amine and rinsed with an acid solution. Conversion coated panels of 5005 were included as controls.

The treated panels were coated with alkyd paint, cured scribed, and exposed to CASS test for 96 hours. The results obtained were as follows:

TABLE VI

| Type of treatment (all amines at 0.025% concentration) | Treatment immersion time, seconds | Rating after CASS test |
|---|---|---|
| Cleaned only | None | 5,5,5,5,5 |
| Alodine 1200S | 15 | 1,1,1,1,1 |
| Conversion Coated 1200S | 15 | 1,1,1,1,2 |
| Hydrazine | 5 | 1,2,1,4,2 |
| Do | 10 | 1,1,1,1,1 |
| Do | 15 | 1,1,1,1,1 |
| Triethanolamine | 5 | 1,3,1,1,2 |
| Do | 10 | 1,1,2,1,1 |
| Do | 15 | 1,1,1,1,1 |
| Diethylenetriamine | 5 | 2,2,2,2,2 |
| Do | 10 | 1,1,1,1,1 |
| Do | 15 | 1,1,1,1,2 |

The results showed that the treatment was as effective on 5005 as on 3003 and performed as well or better than the conversion coating.

Additional testing has shown that the treatment is also effective on the 7XXX series zinc containing alloys, such as 7075 and the copper containing 2XXX series, such as 2024.

On the basis of such testing, it can be concluded that the treatment of the present invention is effective in treating all aluminum alloys from the 1XXX series through the 8XXX series.

EXAMPLE V

To see if a distinct difference could be shown between the process of the present invention and the conversion coating, three specimens from the 10 and 15 second treatments of each of the amines and three specimens of the conversion coating were given an additional 96 hour CASS exposure.

Results after a total of 192 hours CASS exposure, including pitting in the non-scribe areas, were as follows.

TABLE VII

| Type of treatment (all amines at 0.025% concentration) | Treatment immersion time, sec. | Scribe line rating after CASS test | Extent of pits in coating (away from scribe line) |
|---|---|---|---|
| Conversion coating | 15 | 2,3,3 | Some. |
| Do | 15 | 3,3,3 | Do. |
| Hydrazine | 10 | 3,3,3 | Few. |
| Do | 15 | 3,3,3 | Many. |
| Triethanolamine | 10 | 2,2,3 | Few. |
| Do | 15 | 3,3,3 | Many. |
| Diethylenetriamine | 10 | 3,2,3 | Few. |
| Do | 15 | 3,3,3 | Many. |

These results indicate that a 10 second treatment is better than the conversion coating, particularly in relation to pitting, whereas a 15 second treatment time is worse.

This shows that optimization of the treatment involves a time of less than 15 seconds.

EXAMPLE VI

The following tests were performed to determine the effectiveness of three (3) chemically different paint systems, i.e., a vinyl, alkyd and acrylic based paint system. Panels of aluminum alloy 3003 were treated with 0.025 and 0.1% solutions of hydrazine, triethanolamine and diethylenetriamine at a treatment time of about 7 to 10 seconds.

A group of panels of the same alloy were treated with the conversion coating treatment of Example I. All panels were painted by dip coating at a withdrawal rate of 1" per minute. The painted samples were dried overnight and cured by baking in the following manner.

TABLE VIII

| Paint system: | Baking schedule |
|---|---|
| Vinyl | 35 seconds at 430° F. |
| Alkyd | 40 seconds at 500° F. |
| Acrylic | 50 seconds at 500° F. |

After aging for 3 days, all panels were scribed diagonally, and CASS tested for 96 hours.

TABLE IX

| | Treatment | Numerical rating of 5 specimens |
|---|---|---|
| Paint system: | | |
| Vinyl | Conversion coated | 1,1,1,1,1 |
| | Hydrazine, 0.025% | 1,1,1,1,1 |
| | Hydrazine, 0.1% | 1,1,1,2,2 |
| | Triethanolamine, 0.025% | 1,1,2,1,2 |
| | Triethanolamine, 0.1% | 1,1,1,1,1 |
| | Diethylenetriamine, 0.025% | 1,1,1,1,1 |
| | Diethylenetriamine, 0.1% | 1,1,2,2,2 |
| Alkyd | Conversion coated | 2,1,1,4,1 |
| | Hydrazine, 0.025% | 1,3,1,1,1 |
| | Hydrazine, 0.1% | 2,1,1,4,1 |
| | Triethanolamine, 0.025% | 1,1,1,1,5 |
| | Triethanolamine, 0.1% | 5,1,1,1,1 |
| | Diethylenetriamine, 0.025% | 1,1,1,1,1 |
| | Diethylenetriamine, 0.1% | 1,1,1,2,1 |
| Acrylic | Conversion coated | 5,3,2,5,5 |
| | Hydrazine, 0.025% | 1,2,1,2,1 |
| | Hydrazine, 0.1% | 2,2,1,1,1 |
| | Triethanolamine, 0.025% | 1,1,1,1,1 |
| | Triethanolamine, 0.1% | 1,2,1,1,1 |
| | Diethylenetriamine, 0.025% | 1,2,1,1,1 |
| | Diethylenetriamine, 0.1% | 2,2,1,3,2 |

Results show that for all paint systems the process of the present invention confers protection equal to or better than the conversion coating treatment.

EXAMPLE VII

Pretreatment for adhesive bonding

*Lap-sear specimens.*—The same properties that account for the good performance of the process of the present invention as a paint pretreatment also result in providing an improved pretreatment for adhesive bonding of aluminum. Consequently, adhesive bonding was investigated in a test program in which treatment times with 0.025% hydrazine were varied in increments between 0 and 60 seconds and adhesively bonded specimens were exposed to the accelerated aging effects of boiling water for various times from 0 to 28 days.

This test program involved nine different immersion times for treatment and five different exposure times resulting in a total of 275 individual specimens including acid-chromate etched specimens (replication of five per set of conditions).

Test specimens were 2024–T3 Alclad aluminum, 0.063" x 4" x 1" strips adhesively bonded with a ½" overlap. The individual specimens were cut from a panel which was made up by bonding two 4" x 6" sheets of aluminum along the 6" wide side with a ½" overlap. Five 1" wide test coupons were cut from each panel prepared in this way.

The adhesive used was a mixture of a bisphenol-A epoxy resin and a polysulfide. The curing agent, diethylenetriamine, was added in the ratio of 7 parts to 100 parts of resin. The adhesive was allowed to cure at room temperature overnight and then at 150° F. for one hour.

Shear strengths of bonds were obtained on a Lima-Baldwin tensile testing machine. Tests were conducted according to ASTM Specification D–1002.

Figure 2:
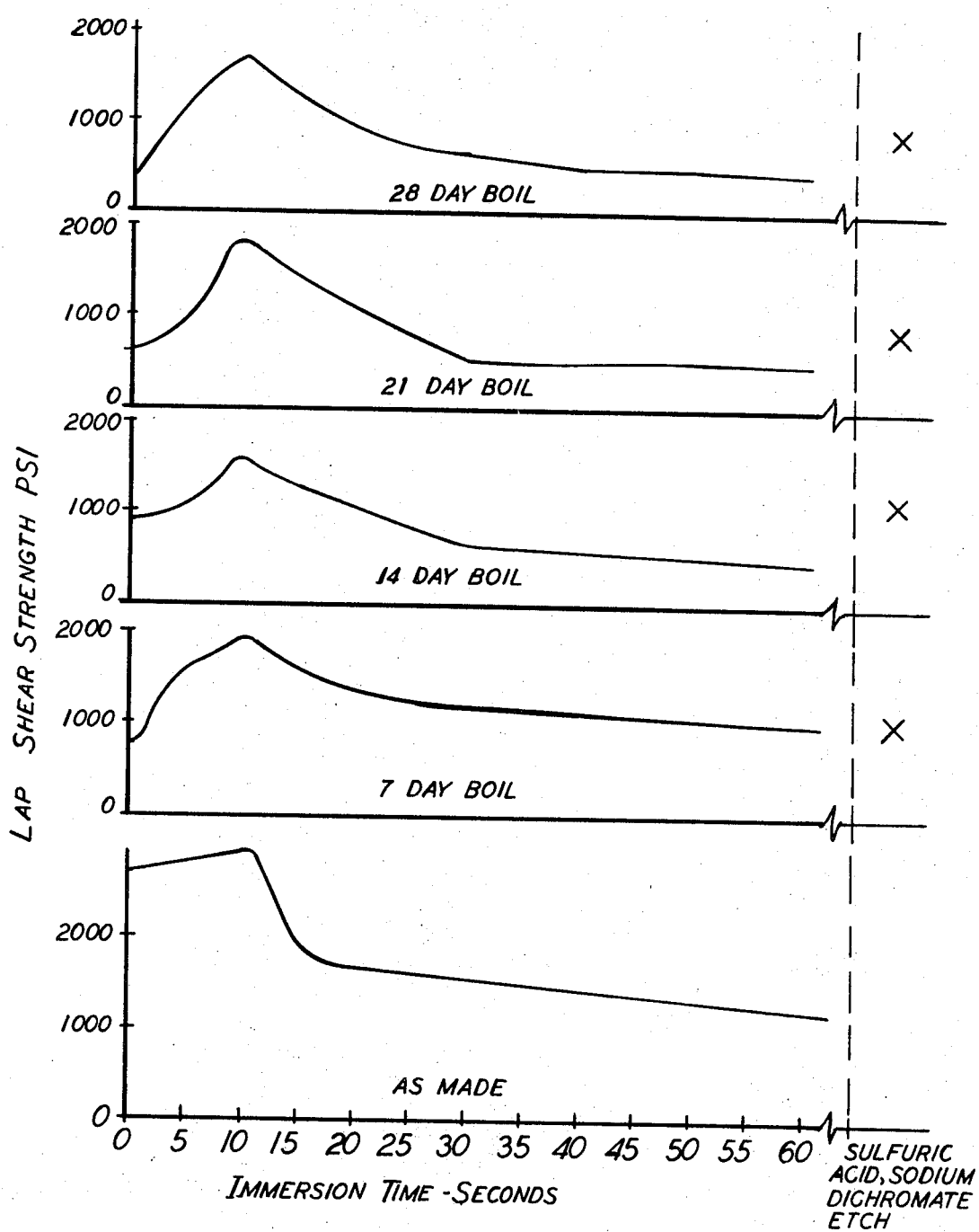

Bond strength results are plotted in FIG. 2. Included to the right of the dotted line are sulfuric-chromic acid etch values for comparison.

All the test results show that if an immersion time less than 15 seconds but more than 5 seconds is used, the bond strength is the highest. The optimum values appear to be at about 10 seconds.

It is, therefore, apparent that not only for paint adhesion, but also for adhesive bonding, that the immersion time is critical and should be more than 5 seconds and less than 15 seconds.

Similar results would be obtained with diethylenetriamine and triethanolamine.

It is to be understood that the invention is not limited to the illustrations described and shown herein which are deemed to be merely illustrative of the best modes of carrying out the invention, and which are susceptible of modifications of form, size, arrangement of parts and detail of operation, but rather is intended to encompass all such modifications which are within the spirit and scope of the invention as set forth in the appended claims.

What is claimed is:

1. The process which comprises contacting aluminum for from 5 seconds to less than 15 seconds with a solution consisting essentially of purified water and from 0.001 to 0.3% by weight of a substance selected from the group consisting of triethanolamine, diethylenetriamine and hydrazine which maintains an aqueous solution pH in the range 7 to 11, said solution being at a temperature of 85° C. to boiling and a pH of 7 to 11, and then applying an organic coating to the so-treated aluminum, the treatment resulting in said coating having improved adherence to said aluminum.

2. A process according to claim 1 wherein said contact time is from 7 to less than 15 seconds.

3. A process according to claim 2 in which said contact time is 7 to 10 seconds.

4. A process according to claim 1 wherein said purified water is deionized water having a specific resistance of at least 0.5 megohm-centimeter.

5. A process according to claim 1 wherein said purified water is distilled water having a specific resistance of at least 0.5 megohm-centimeter.

6. A process according to claim 1 wherein said amine is selected from the group consisting of diethylenetriamine and triethanolamine.

7. A process according to claim 1 wherein said amine maintains an aqueous solution in the range 8.9 to 10.8.

8. A process according to claim 1 wherein said aluminum is aluminum strip moving at the rate of 200 to 300 feet per minute.

9. A process according to claim 1 wherein said amine is utilized in a concentration from 0.01 to 0.2% by weight.

10. A process according to claim 1 wherein said coating is paint.

11. A process according to claim 1 wherein said aluminum is stored for a substantial period of time after said treatment before carrying out said coating step.

12. A process according to claim 1 in which a uniform oxide coating of 5 to 200 millimicrons thick results from said contacting step.

13. A process according to claim 10 in which the paint is a paint having a base selected from the group consisting of vinyl, alkyd and acrylic bases.

14. A process according to claim 1 in which said coating step is adhesive bonding.

References Cited

UNITED STATES PATENTS

| 3,215,564 | 11/1965 | Thirsk | 148—6.27 |
| 3,247,026 | 4/1966 | Switzer | 148—6.3 |

FOREIGN PATENTS

| 630,229 | 7/1963 | Belgium. |
| 643,501 | 5/1964 | Belgium. |

RALPH S. KENDALL, Primary Examiner

U.S. Cl. X.R.

148—6.14